Nov. 15, 1955 S. SCHIERMAN 2,723,864
HAND CART FOR TRANSPORTING CYLINDRICAL CONTAINERS
Filed Jan. 12, 1953
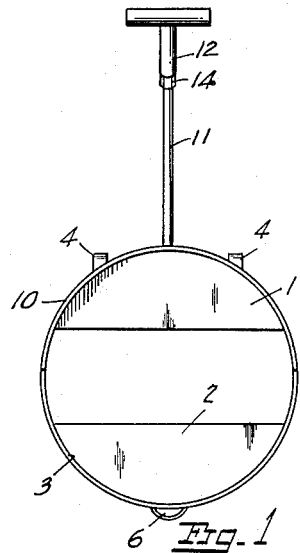
Fig. 1
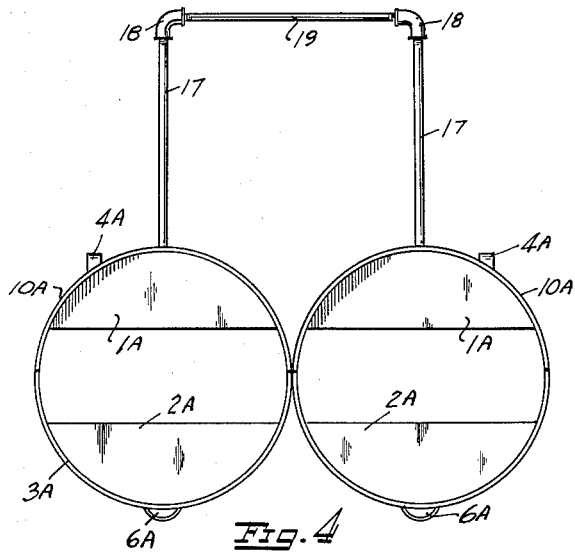
Fig. 4
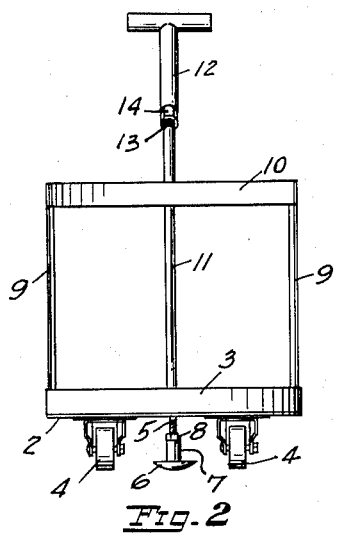
Fig. 2
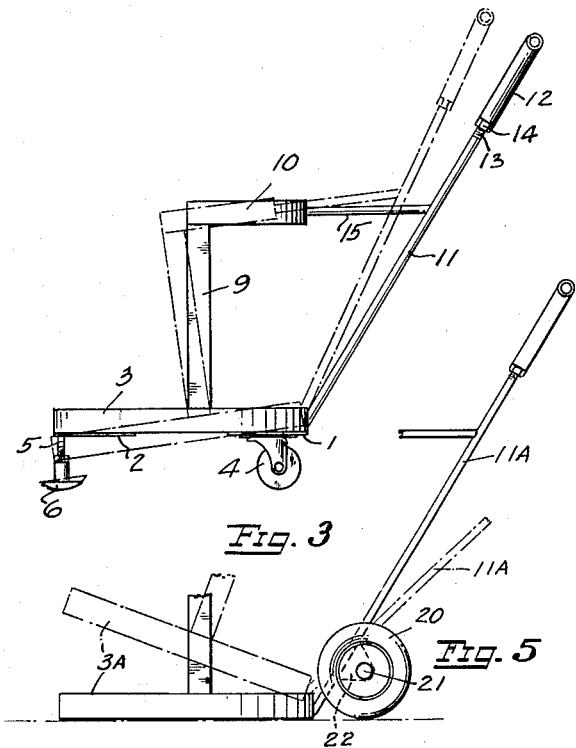
Fig. 3
Fig. 5
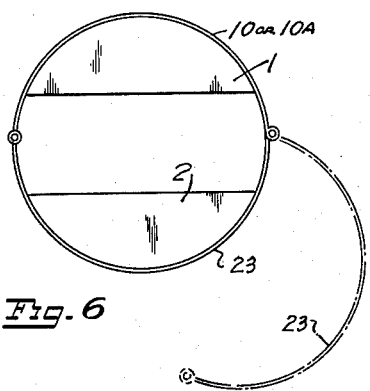
Fig. 6
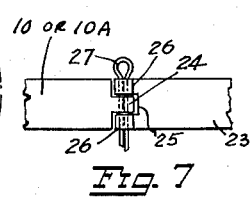
Fig. 7
SAMUEL SCHIERMAN
INVENTOR.
BY
ATT'Y

United States Patent Office 2,723,864
Patented Nov. 15, 1955

2,723,864

HAND CART FOR TRANSPORTING CYLINDRICAL CONTAINERS

Samuel Schierman, Portland, Oreg., assignor of one-fourth to C. Victor Collin, Portland, Oreg.

Application January 12, 1953, Serial No. 330,728

1 Claim. (Cl. 280—47.24)

This invention relates to improvements in hand carts specially designed for conveying heavily loaded cylindrical containers or buckets such as are used for molten tar, and other heated fluids wherein spillage would be injurious to a handler and damaging to surfaces upon which the molten material would be accidentally spilled.

One of the principal objects of the invention is the provision of a cart of this character which is of circular formation in top plan view to accommodate containers of a large variety of sizes and which is adjustable from a horizontal to a forwardly or rearwardly tilting position to prevent accidental rearward tipping of the cart when loaded and to also render the container more accessible to a user specially when dipping a tar mop into a bucket and removing the mop therefrom. The forward tilting of the container prevents any spillage or drippings, upon withdrawing the mop, from running down the wall of the container and onto portions of the cart and instead causes it to drop directly to the floor, roof, or other surface being dealt with.

These and other objects will appear as my invention is more fully hereinafter described in the following specification, illustrated in the accompanying drawings and finally pointed out in the appended claim.

In the drawings:

Figure 1 is a top plan view of a hand cart made in accordance with my invention.

Figure 2 is a front elevation of Figure 1.

Figure 3 is a side view of Figure 2.

Figure 4 is a top plan view of a modified form of the invention.

Figure 5 is a fragmentary side elevation of a further modified form of the invention.

Figure 6 is a detail plan view of a locking band.

Figure 7 is a fragmentary detail view of a locking mechanism.

Referring now more particularly to the drawing:

The base of the cart illustrated in Figures 1 to 3, is made up of two spaced apart segmental plates indicated by reference numerals 1 and 2. Secured to these plates by any suitable means, such as welding or the like, is a ring 3. To the underside of the plate 1 I pivotally attach a pair of caster wheels 4.

On the underside of the plate 2 near the forward edge thereof I provide a threaded stud 5 to which is adjustably attached a foot 6 having an internally threaded vertical extension 7 for adjustable threaded engagement with the stud 5 and lockable in any adjusted position by means of a locknut 8 threaded on the stud 5. By this arrangement the cart (see Figure 3) may be tilted from a horizontal position as shown in full lines to the position shown in broken lines or to any intermediate position and locked in any selected tilted position by the locknut 8 as aforesaid.

Superimposed upon the ring 3 and secured thereto by welding or the like are two vertical standards 9 to whose upper ends I secure by welding or the like a semi-circular band 10. It will be noted in Figures 1 and 3 that the outer ends of the band terminate slightly rearward of the center of the circular base to enable it to receive a container having a diameter equal to that of the inside diameter of the ring 3. To the rear of the ring 3 I secure by welding or the like the bottom end of a handle 11 to whose upper end I attach a T-shaped hand-grip having an internally threaded extension 12 for adjustable positioning with respect to the handle 11 by means of the external threads 13 provided thereon. The hand-grip can be locked in any of its adjusted positions by means of a locknut 14 provided on the handle 11. The handle is braced by a horizontal rod 15 secured at one of its ends by welding or the like to the handle and at its opposite end to the semi-circular band 10.

In the modified form of the invention illustrated in Figure 4, the plates 1A—2A, rings 3A, adjustable feet 6A, and caster wheels 4A, are identical with those shown in the other form of the invention, however, I provide only one caster wheel on each plate 1A instead of two as shown in the other form. The abutting edges of the rings 3A and the inner ends of the semi-circular bands 10A are secured together by welding, bolting, or any other suitable means. A handle in the form of a bale is provided and is made up of two upwardly and rearwardly extending rods or pipes 17 secured at their bottom ends by welding or the like to the rear edges of the rings 3A at their bottom ends and are connected at their top ends by fittings 18 to a cross-member 19 to serve as a hand grip.

In the form of the invention illustrated in Figure 5, the segmental base plates and rings 3A are adapted to normally rest upon the floor or other support in a horizontal position as shown. For tilting the hand cart rearwardly for transporting it or for any other purpose I rotatably mount a pair of supporting wheels 20 upon an axle 21 secured to the lower end of the handles 11A by means of brackets 22.

In Figure 6 I have illustrated a semi-circular band 23 adapted to be removably and hingedly attached at both of its ends to the fixed semi-circular band 10 or 10A of any one of three forms of the invention. As illustrated in Figure 7 both ends of the fixed band 10 or 10A are reduced in width and turn back on themselves as at 24 for insertion within the bifurcated ends 25 of the semi-circular band 23 which are turned back on themselves at 26 for alignment with the turned-back portion 24 of the ends of the fixed band to receive a removable hinge pin 27. By this arrangement the band 23 may be held securely in place by both pins, for retaining a container or other load upon and within the cart, or upon removal of one pin may be swung outwardly about the pivot established by the opposite pin.

While I have shown particular forms of embodiment of my invention, I am aware that many minor changes therein will readily suggest themselves to others skilled in the art without departing from the spirit and scope of the invention.

Having thus described my invention, what I claim as new and desire to protect by Letters Patent is:

A hand cart of the class described comprising in combination, a circular base made up of two spaced apart segmental plates, a circular ring secured to said plates and extending upwardly therefrom, a pair of caster wheels pivotally attached to the underside of one of said plates, a vertically adjustable depending foot attached to the underside of the other of said plates, a semi-circular band secured by vertical standards to the base in vertically spaced relation thereto, a handle secured to said ring and extending upwardly and rearwardly therefrom, a rod secured at one of its ends to said handle and at its other end to said semi-circular band, and a T-shaped hand grip adjustably attached to the upper end of said handle.

References Cited in the file of this patent

UNITED STATES PATENTS

| Number | Name | Date |
|---|---|---|
| 208,172 | Harper | Sept. 17, 1878 |
| 1,555,772 | Stripe | Sept. 29, 1925 |
| 1,754,407 | Stearman | Apr. 15, 1930 |
| 1,757,490 | Tibbetts | May 6, 1930 |
| 2,073,114 | Martin et al. | Mar. 9, 1937 |
| 2,409,786 | Norton | Oct. 22, 1946 |
| 2,575,968 | McCallum et al. | Nov. 20, 1951 |
| 2,634,933 | Grimsley | Apr. 14, 1953 |